Sept. 20, 1949.  L. H. FLORA  2,482,614

HANDLE ATTACHMENT OR THE LIKE

Filed June 30, 1947

INVENTOR
LAURENCE H. FLORA
BY  H. G. Lombard
ATTORNEY

Patented Sept. 20, 1949

2,482,614

UNITED STATES PATENT OFFICE 2,482,614

HANDLE ATTACHMENT OR THE LIKE

Laurence H. Flora, Cleveland, Ohio, assignor to Tinnerman Products, Inc., Cleveland, Ohio, a corporation of Ohio Application June 30, 1947, Serial No. 758,098

4 Claims. (Cl. 287—20)

This invention relates in general to the art of attaching handles, knobs, and like accessories employed in the manufacture of sheet metal ware, for example, and is directed, more particularly, to the provision of simple inexpensive means for mounting handles, knobs, etc., on various kitchen utensils such as percolators, coffee pots and cooking vessels.

A primary object of the invention is to provide an improved knob or handle mounting in which the knob or handle is rigidly attached to a supporting wall by a bolt or screw having a resilient threaded connection with an improved sheet metal connecting device in a manner whereby the knob or handle is secured without subjecting the same to such bending stress or strain as would crack an enamelled surface on the supporting wall, for example.

A further object of the invention is to provide such a handle mounting embodying a simple, inexpensive, one-piece connecting device which is fully concealed in the completed mounting.

Another object of the invention is to provide a mounting of the kind described comprising an improved form of connecting device which is designed not only to secure the handle or other object but also to support the same and add to the strength and rigidity thereof in the completed mounting.

An additional object is to provide in such a knob or handle construction, or the like, a sheet metal connecting device including integral bolt or screw engaging means struck and formed therefrom comprising elements adapted to engage a threaded fastener in the manner of a self-locking nut thereby enabling the positive, rigid attachment of the handle or other object by means of screws and bolts without the use of threaded nuts or lock washers of any kind.

Further objects and advantages of the invention, and other new and useful features in the construction, arrangement, and general combination of parts thereof, will be readily apparent as the following description proceeds with reference to the accompanying drawings, for purposes of illustration but not of limitation, in which like reference characters designate like parts throughout, and in which.

Figure 1:
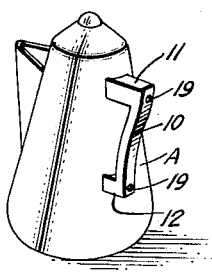
Fig. 1 represents a conventional coffee pot or the like of the type having a handle made of wood or plastic which is attached by the improved fastening arrangement of the invention.

The handle, knob construction or the like, of the invention is directed to the provision of various types of fastening installations in which an inexpensive, one-piece, sheet metal connecting device is employed without the use of threaded nut fastenings of any kind, and by which the knob, handle, or other object is secured in a strong and durable mounting under continuously effective spring tension that not only compensates for strains and bending stresses set up in tightening of the mounting thereby minimizing any possibility of chipping or cracking of enamelled surfaces, but also ensures a substantially locked fastening engagement of the securing bolt or screw with the complementary bolt engaging means provided in the connecting device such that there is little likelihood of the mounting becoming loose by reason of frequent handling and unusual wear over a long period of use. To this end, the present invention contemplates the provision, in the connecting device, of integral bolt engaging means comprising an element or elements struck from the material of the connecting device and otherwise suitably formed therefrom to engage the securing bolt or screw in the manner of a nut. Thus, the use of conventional threaded nuts is entirely dispensed with and the connecting devices so provided have the distinct advantages of being light in weight and considerably cheaper in production, assembling operations and other items involved in the costs of manufacture. For example, in the manufacture of enamelled sheet metal ware, such integral bolt receiving means in the connecting device, being thin, sharp-edged and practically threadless, have no threads which may become clogged by the coating of enamel thus eliminating the necessity for threading the bolts thereinto prior to the application of the enamel as is necessary in knob and handle construction embodying conventional threaded nuts.

A further advantage of the use of such integral bolt receiving means provided in the sheet metal connecting device, resides in the fact that the element or elements comprising the same are so formed as to effect a self-locking action with the bolt or screw securing the knob or handle in a completed mounting; and accordingly, since a self-locking fastening engagement is provided, there is no necessity for the use of lock washers, and the like, with the resultant savings not only in the cost of these devices, but also, in the expense and labor involved in the tedious, time consuming assembling operations which such fastenings require.

Referring now, more particularly, to the drawings there is illustrated by way of example only, an application of the invention as employed in the mounting of a handle 10, on a cooking utensil or any other suitable structure which comprises a wall portion onto which the handle or other object is to be mounted. Such a wall portion may be of any suitable metal, wood, plastic or fibreboard material and in the present example, comprises a sheet metal wall portion of the coffee pot designated generally A. The handle member 10 comprises a one-piece accessory provided from any suitable insulating material such as hardened plastic compositions, vulcanized fibres, hard wood, etc., and may be of any desired shape or configuration, to include an arm 11 on its upper portion and a similar shorter arm or handle end 12 in the lower portion thereof. Said arms 11, 12 are connected to the sheet metal wall A by the improved connecting or attaching device of the invention and inasmuch as the fastening arrangement in either instance is more or less the same, the mounting for the arm 11 only is described, it being apparent that the attachment of the other arm 12 is effected in substantially the same manner.

Figure 4:
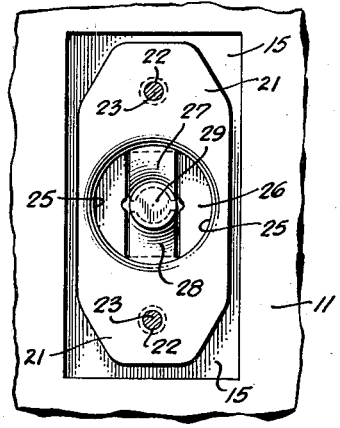
Fig. 4 is a sectional view of Fig. 2 taken along line 4—4, looking in the direction of the arrows.
Figure 2:
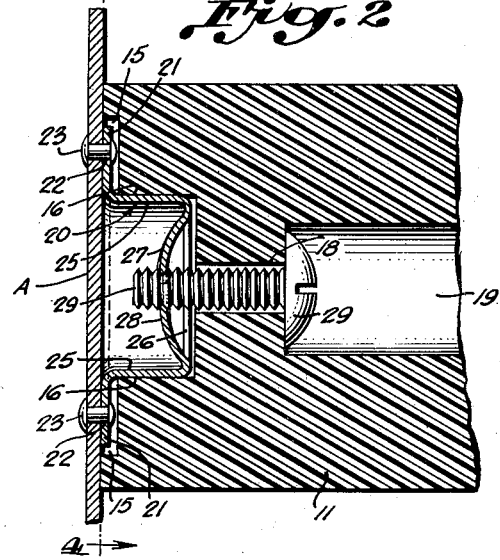
Fig. 2 is a vertical sectional view through the upper arm of the handle shown in Fig. 1 with the improved connecting device shown in section.
Figure 3:
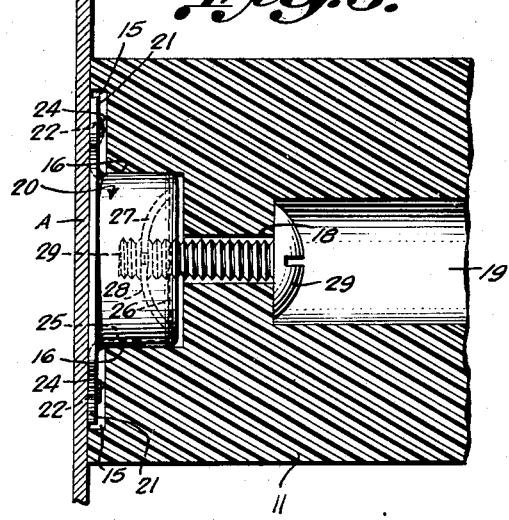
Fig. 3 is a similar sectional view showing the improved connecting device in elevation and illustrates an alternate attaching arrangement.

The arm 11 is of comparatively small cross-section and is provided with a relatively small recess comprising a suitable countersunk area 15 and an adjacent generally circular bore 16 into which the fastening device is fully received as shown in Figs. 2, 3, and 4. The said recess comprising the generally circular bore 16 is of relatively simple outline and may be readily provided for in the molding operation or in any other suitable manner thereafter as by a simple drilling operation. A bolt opening 18 communicates with said bore 16 and adjoining said bolt opening, the handle arm 11 is provided with a horizontal passage 19 through which the bolt or screw is applied to secure the handle in completing an installation.

Figure 5:
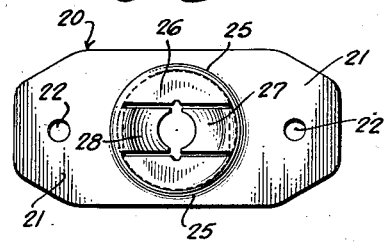
Fig. 5 is a top plan view of the connecting device per se.
Figure 6:
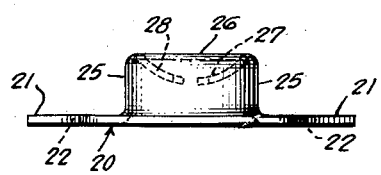
Fig. 6 is a front elevational view of the fastening device per se shown in Fig. 5.

As shown in Figs. 5 and 6, the improved connecting or attaching device 20 of the invention, may be most economically constructed in one piece from a simple, inexpensive section of sheet metal. Any suitable sheet metal may be employed but preferably that of a spring metal nature such as spring steel or cold rolled metal having spring-like characteristics. In the present example, the connecting device 10 is provided from a relatively small section of any suitable sheet metal strip material and accordingly, is admirably suited for economical quantity production in that it may be provided from ordinary sheet metal strip stock with a minimum loss or waste of material. In general, the improved connecting device 20 comprises a fastener body defined by opposing end flanges 21 provided with suitable holes 22 for the application of rivets 23, Figure 2, in attaching the connecting device to the supporting wall A, or, as illustrated in Fig. 3, for the application of welds 24 or solder in an alternate attaching arrangement. By the use of such welds 24, Fig. 3, the wall A is smooth and imperforate in a completed mounting such that no leakage is possible and there are no exposed fastenings within the cooking utensil or the inner surface of any other article to which a handle or similar object may be attached in accordance with the invention. The central area of the fastener body between the flanges 21 is formed into an integral upstanding annular hub defining a hollow or tubular generally cylindrical wall 25 the periphery of which is of a size approximating the inner area of the generally circular bore 16 in the handle arm 11. This cylindrical wall 25 is relatively strong and rigid and accordingly, is designed to be snugly received within the bore 16 in handle arm 11 to serve as a bushing which rigidly supports the handle against lateral thrust and strain that necessarily occurs in frequent every day usage of the appliance. The top or crown of the cylindrical wall 25 comprises a disc-like base 26, Fig. 5, which is provided with integral bolt or screw engaging means 27, 28 that project inwardly within the inner area of said cylindrical wall.

The thread engaging elements 27, 28 are best provided from the sheet metal material of the base 26 by an aperture intermediate spaced parallel slits which form cooperating tongues, or the like, having spaced extremities defining the desired thread or thread opening corresponding substantially to the root diameter of the bolt or screw for threadedly engaging the thread thereof. Said tongues 27, 28 otherwise are preferably formed to project inwardly out of the plane of the base 26 and are bent lengthwise in substantial ogee formation to provide for the maximum strength obtainable to withstand the tightening action of the bolt or screw as it is advanced to final applied fastening position.

Such thread engaging means may be pressed, stamped, extruded, or otherwise provided on the fastener in any suitable form or construction so long as the same threadedly engage with the thread of the bolt or screw 29 and, in this relation, the present invention fully contemplates the provision of such thread engaging means in various other similar and related forms, as in the manner of a keyhole type of thread opening, or a perforated protuberance which is pressed from the sheet metal and shaped to provide a helical thread or thread opening, or otherwise has the walls thereof tapped to provide a plurality of threads for threadedly engaging the bolt or screw. However, it has been found that such thread engaging means prepared in the form of cooperating, yieldable tongues as shown, are the most efficient and the most practical in that they are possessed of unusual inherent strength and will not collapse or pull through when the bolt 29 is tightened, nor loosen under continuous strain incidental to frequent handling of the appliance. This takes place by reason of the fact that the sheet metal material from which such tongues are formed is of less thickness than the pitch or spacing between adjacent thread convolutions on the bolt or screw, wherefore the extremities of said tongues tend, more effectively, to move toward each other and dig into the grooves intermediate adjacent thread convolutions when tightened and otherwise become embedded in the root of the bolt in locked, frictional fastening engagement therewith. Thus, in the present example, the tongues 27, 28 are shown as extending inwardly out of the plane of the base 26 in substantial ogee formation and provided preferably with notched extremities, forming substantial biting jaws designed to cut into the root of the bolt and the adjacent thread surfaces thereon in positive locking relation therewith in the most effective manner. There is thereby eliminated the necessity for a separate, auxiliary locking means such as a lock nut or lock washer and this, in mass production, makes possible a considerable saving not only in the cost of such locking devices, but also, in the expense and labor involved in the assembling operations and other added steps in manufacture which such auxiliary locking means require. It is to be understood, however, that the present invention is not limited in any manner or form to the illustrated construction of the thread engaging means but rather, comprehends also, various other similar and related forms of such tongues or equivalent thread engaging elements.

It will be appreciated that the connecting device may be formed from a minimum of material with an adequate, suitable section for providing the bolt engaging means comprising cooperating resilient tongues 27, 28 which are much more desirable than any similar bolt engaging means because of the greater general utility and practicability thereof and the unusual strength afforded thereby. The connecting device thus provided is most simple and inexpensive and by reason of its cup-shaped construction requires only a minimum of space such that it is admirably suited for use in installations calling for compact, small fastenings such as, for example, the cylindrical bore arrangement 16, Fig. 2, in the arm 11 of the handle construction shown.

The connecting devices 20 are united to the sheet metal wall A at predetermined spaced points corresponding to the spacing of the bores 16 in the arms 11, 12 of the handle. The connecting devices are secured either by rivets 23, as shown in Fig. 2 or by welds 24 as illustrated in Fig. 3. In either case, after the connecting devices 20 have been attached to the wall member A, if the completed article is to have an enamel finish, the assembly described may be enamelled with any desired number of coats without in any way affecting the operativeness of the bolt engaging elements 27, 28 in subsequently threadedly engaging the same with the bolts or screws 29 to secure the handle. In this respect, a most decided advantage is obtained in the use of the connecting devices of the instant invention over any heretofore known arrangement embodying conventional threaded nuts. In the use of conventional threaded nuts, it is necessary first to assemble the bolt in the nut to protect the threads of the same from being clogged with enamel during the enamelling operation, and thereafter remove the bolt in assembling the knob or handle on the sheet metal part, and then, again apply the bolt to the nut in attaching the handle to complete the mounting. In the use of the connecting devices disclosed herein, the bolt engaging elements 27, 28 are necessarily thin, sharp edged and practically threadless and consequently have no threads which may become clogged by the application of any number of coatings of enamel; thus, there is no necessity for the separate operation of inserting the bolt into said bolt engaging means 27, 28 to protect the same during the enamelling operation, and accordingly, the handle or knob may be applied to assembled relation with the spaced connecting devices 20 immediately after any such enamelling and the bolt fastenings 29 readily threaded to locked fastening engagement with the bolt engaging means in completing the mounting.

In completing the handle mounting, the handle is applied to the sheet metal wall surface A in assembled relation with the previously attached connecting devices 20 which are fully received in the recesses 15, 16 to be completely concealed, thereby adding to the effectiveness of the appearance and design of the handle mounting. The bolts 29 are then applied through the passages 19 in the handle arms 11, 12 into threaded engagement with the thread engaging elements 27, 28 of the respective connecting devices. After the securing bolts 29 have been tightened to locked fastening engagement, the bolt passages 19 may be closed by plugs, buttons or any other suitable finishing object to conceal the heads of the bolts and otherwise enhance the general appearance of the handle construction.

In tightening the securing bolts to provide a fixed, rigid mounting of the handle on the sheet metal wall member A, it will be noted that the extremities of the arms 11, 12 bear directly upon the wall member, and, in the event said wall member had been enamelled, this, of course, would appear objectionable since cracking and chipping of the enamel could possibly result incidental to bending stresses set up on tightening of the securing bolts. However, inasmuch as the integral bolt engaging elements 27, 28 are resilient, they are adapted to yield on tightening of the bolt to compensate for any bending stresses which might otherwise be transmitted to the enamelled wall member. Accordingly, it may be readily understood that in the instant handle construction embodying the described sheet metal connecting devices, a further most important advantage is obtained in that on tightening the securing bolts to complete the handle mounting, very little bending stress, if any, is communicated to the enamelled wall member wherefore possibility of chipping, cracking or breaking of the enamel is greatly minimized and in many installations completely eliminated.

In the completed handle mounting, a further advantage resides in the design of the connecting device 20 with the tubular or cylindrical wall 25 which is snugly received in the bore 16 in the associated handle arm in the manner of a bushing or bearing to support the arm with a high degree of strength and rigidity in conjunction with the securing bolt 29.

The foregoing advantages in the general combination of parts comprising a handle or knob construction, and the like, all result from the use of the simple, inexpensive and highly practical sheet metal connecting devices of the invention. In this respect, it will be quite obvious that such sheet metal connecting devices may be provided in numerous modified forms without departing from the teachings of this invention directed to the general combination of a handle or knob construction. It will also be appreciated that the invention is equally applicable in any other installation embodying a sheet metal wall surface or panel which comprises an integral part of an assembly such as sheet metal cabinets, and door or drawer constructions employed in refrigerators, gas or electric ranges, and the like.

Although in the foregoing description and the accompanying drawings, the disclosure is directed to a handle construction, it is obvious that the invention is applicable wherever an operating member or gripping element is to be mounted onto a wall member, particularly a sheet metal wall surface. Accordingly, it is to be understood that the disclosure is not limited to any strict interpretation of the word "handle" as used in the accompanying claims but should be considered as also defining knobs, gripping devices, drawer pulls, and the like.

While the invention has been described in detail with a specific example, such example is intended as an illustration, since it will be apparent to those skilled in the art that other modifications in the construction, arrangement and general combination of parts may be devised without departing from the spirit and scope of the invention. The present embodiment is therefore to be considered in all respects as illustrative and not restrictive, the scope of the invention being indicated by the appended claims rather than by the foregoing description, with all changes falling within the scope, meaning, and range of equivalency of the claims intended to be embraced therein.

What is claimed is:

1. A mounting for attaching a handle, knob, or other article to a support comprising a sheet metal connecting device having a flange at either end united to said support and an integral hollow substantially cylindrical tubular wall projecting outwardly from the support and defining a fastener base spaced from said support, integral resilient thread engaging means comprising a tongue stamped from the material of said fastener base adjacent a thread opening therein and extending within said hollow substantially cylindrical tubular wall for threadedly engaging a bolt or screw in the manner of a nut, a bolt or screw threadedly connected with said resilient thread engaging means and securing the article to the support in a resilient mounting provided by the resiliency of said thread engaging means, said article having a recess housing the connecting device and substantially concealing the same in the completed mounting.

2. A mounting for attaching an article to a support comprising a sheet metal connecting device having a flange at either end united to said support and an integral hollow projection in the form of a generally tubular hub projecting outwardly from the support and defining a fastener base at the top of said hub, integral resilient thread engaging means struck from said fastener base and formed to extend inwardly within said tubular hub for threadedly engaging a bolt or screw in the manner of a nut, a bolt or screw threadedly connected with said resilient thread engaging means and securing the article to the support in a resilient mounting provided by the resiliency of said resilient thread engaging means, said article having a recess housing the connecting device and substantially concealing the same, said recess including a bore corresponding substantially to the contour of the tubular hub of the connecting device, and said tubular hub being received in said bore to support and rigidify the article in the completed mounting.

3. A mounting for attaching a handle, knob, or other article to a support comprising a sheet metal connecting device having a flange at either end united to said support and an integral hollow projection in the form of a generally cylindrical hub projecting outwardly from the support and defining a fastener base spaced from said support, integral resilient thread engaging means comprising cooperating tongues struck from said fastener base and formed to extend inwardly within said hollow cylindrical hub for threadedly engaging a bolt or screw in the manner of a nut, a bolt or screw threadedly connected with said cooperating resilient tongues and securing the article to the support in a resilient mounting provided by the resiliency of said tongues, said article having a recess housing the connecting device and substantially concealing the same, said recess including a cylindrical bore corresponding substantially to the contour of the hollow cylindrical hub of the connecting device, and said hollow cylindrical hub being received in said cylindrical bore to support and rigidify the article in the completed mounting.

4. A connecting device comprising a sheet metal body defining a flange and an upstanding hollow projection in the form of a substantially cylindrical tubular wall having a fastener base at the top of said wall, and thread engaging means comprising an integral tongue struck from the material of said base adjacent a thread opening therein and formed to extend within said substantially cylindrical tubular wall.

LAURENCE H. FLORA.

REFERENCES CITED

The following references are of record in the file of this patent:

UNITED STATES PATENTS

| Number | Name | Date |
|---|---|---|
| 1,306,100 | Chadwick | June 10, 1919 |
| 2,155,810 | Tinnerman | Apr. 25, 1939 |
| 2,172,524 | Stevens | Sept. 12, 1939 |